UNITED STATES PATENT OFFICE.

CHARLES CLEMM, OF PHILADELPHIA, PENNSYLVANIA, AND AUGUST CLEMM, OF MANNHEIM, BADEN.

IMPROVEMENT IN THE MANUFACTURE OF ANILINE-RED.

Specification forming part of Letters Patent No. 50,335, dated October 10, 1865.

*To all whom it may concern:*

Be it known that we, CHARLES CLEMM, of Philadelphia, State of Pennsylvania, and AUGUST CLEMM, of the city of Mannheim, in the Grand Dukedom of Baden, have invented a new and useful Process of Manufacturing Aniline-Red; and we do hereby declare the following to be a full and exact description of the same.

Our improvement in the process of preparing aniline-red is based on the reciprocal decomposition of the salts of aniline and its homologues—such as tolindin, xylidine, cunidin, cynidin—and by the arsenic-acid salts, more especially those of the alkaline bases. The best adapted to this effect are the sulphates of aniline and its homologues, although the aniline salts of other acids, especially those of the inorganic series, are applicable.

It is almost indifferent which of the arsendites are employed, only it is necessary to use such proportions of the proper aniline salts that in each instance the acid of the aniline salts will combine with the base of the arsenic-acid salt, according to their chemical equivalents, and vice versa, so that the arsenic acid of the arsenical salt used combines in equivalents with the aniline or its homologue salt employed, so that perfect decomposition can be obtained. Arseniate of soda is, on account of facility of preparation and for various other reasons, best adapted for this process, and especially the salt of the combination or composition $2NaO,HO,AsO_5+24aq$. One equivalent of this salt treated with two of sulphate of aniline results in two equivalents of sulphate of soda and one of arseniate of aniline of the composition $(2C_{12}H_7N)HO,AsO_5$, which, under the influence of heat, parts with almost one equivalent of aniline, so that nearly $C_{12}H_7NAsO_5$ remain, which, by increased temperature, is decomposed into aniline-red.

Suitable proportions for the process of manufacture are the use of one part, in weight, of the above-named arseniate of soda to one part of the sulphate of aniline hereinafter described, The mixture is fused in a properly-adapted—say cast-iron—vessel, and with repeated stirring and continued application of heat the temperature of the mass is raised to 210° of the centigrade thermometer, until the substance becomes dry and of a bronze color.

The sulphate of aniline is prepared by mixing one part of sulphuric acid of 66° Baumé with one part of water and stirring into this two and one-half parts of commercial aniline. The resulting product will promptly assume an almost dry appearance.

To extract the coloring-matter or aniline-red out of the above-obtained frit or dry mass, the sulphate of soda in combination is either removed by lixiviation with cold water and the insoluble residue dissolved in muriatic acid, or the frit at once treated with that acid, and after sufficient dilution with water the acid is neutralized best with carbonate or caustic soda, and the precipitated coloring-matter recrystallized in pure water. For the purification, well-known or other processes can, of course, also be followed.

What we claim is—

The treatment of salts of aniline and its homologues by the arseniates of the alkalies, substantially as above described, for the production of aniline-red.

CHARLES CLEMM.
AUGUST CLEMM.

Witnesses to the signature of Charles Clemm:
 CHARLES LENING,
 CHS. CLEMM, Jr.

Witnesses to the signature of August Clemm:
 OTTO DORLUG,
 GEORG GINZ.